(12) United States Patent
Herzig

(10) Patent No.: US 9,981,548 B2
(45) Date of Patent: May 29, 2018

(54) FILLER NECK HOUSING OR CHARGING HOUSING

(71) Applicant: ILLINOIS TOOL WORKS INC., Glenview, IL (US)

(72) Inventor: Juergen Herzig, Buchbrunn (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days. days.

(21) Appl. No.: 15/120,139

(22) PCT Filed: Dec. 12, 2014

(86) PCT No.: PCT/US2014/070086
§ 371 (c)(1),
(2) Date: Aug. 19, 2016

(87) PCT Pub. No.: WO2015/130385
PCT Pub. Date: Sep. 3, 2015

(65) Prior Publication Data
US 2017/0057346 A1 Mar. 2, 2017

(30) Foreign Application Priority Data
Feb. 27, 2014 (DE) .................. 10 2014 102 622

(51) Int. Cl.
*B65B 3/00* (2006.01)
*B60K 15/04* (2006.01)
(Continued)

(52) U.S. Cl.
CPC .............. *B60K 15/04* (2013.01); *B60K 15/05* (2013.01); *B60L 11/1816* (2013.01);
(Continued)

(58) Field of Classification Search
CPC ............ B60K 15/04; B60K 2015/0483; B60K 15/0406; B60K 2015/048; B60K 2015/0461
See application file for complete search history.

(56) References Cited

U.S. PATENT DOCUMENTS 8,430,140 B2 * 4/2013 Ognjanovski ...... B60K 15/0406
141/350
8,555,937 B2 * 10/2013 Murabayashi ......... B60K 15/04
141/312
(Continued)

FOREIGN PATENT DOCUMENTS

DE 102009039810 A1 3/2011
WO 2004024488 A1 3/2004
WO 2013173684 A1 11/2013

OTHER PUBLICATIONS

ISR and WO for PCT/US2014/070086 dated Mar. 11, 2015.

*Primary Examiner* — Shawn M Braden
(74) *Attorney, Agent, or Firm* — Hauptman Ham, LLP

(57) ABSTRACT

A filler neck housing or charging housing for insertion into a body opening in a motor vehicle, comprising a housing section with a first sealing section and a second sealing section, the first sealing section being provided on an outer edge, which can be inserted into the body opening, of the housing section and being designed to bear in a sealing manner on the body opening, and the second sealing section being provided on a passage opening in the housing section, into which a tank filler pipe or a plug-in charging connector can be inserted, the second sealing section being designed to bear in a sealing manner against the tank filler pipe or the plug-in charging connector.

16 Claims, 4 Drawing Sheets

Figure 1:
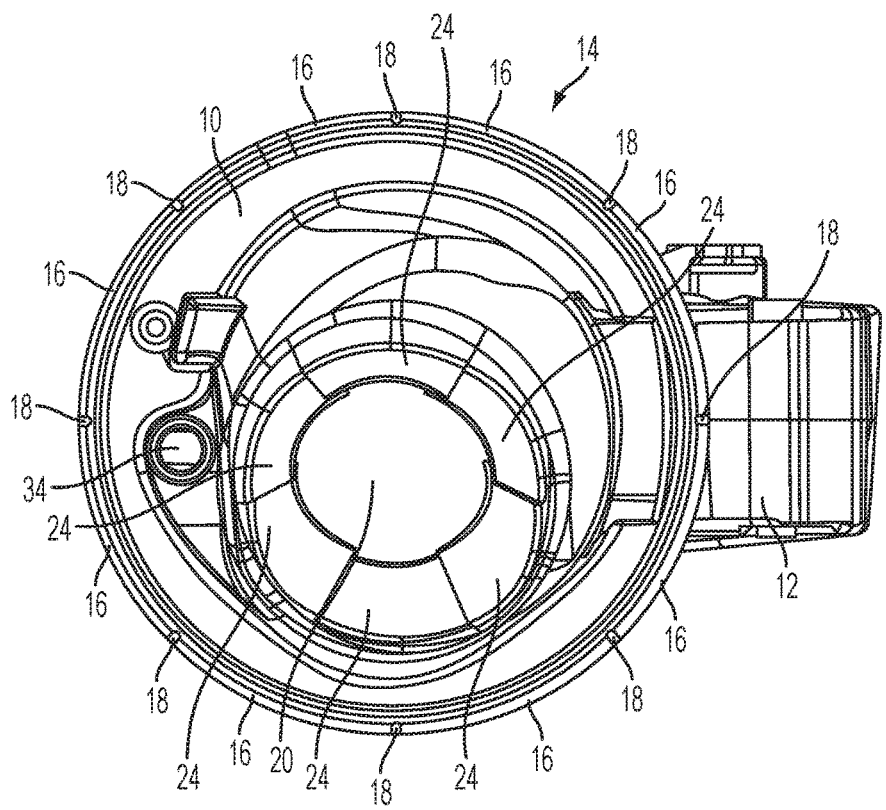

(51) Int. Cl.
    *B60K 15/05*      (2006.01)
    *B60L 11/18*      (2006.01)
    *H02J 7/00*       (2006.01)

(52) U.S. Cl.
    CPC ........ *H02J 7/0042* (2013.01); *B60K 15/0406* (2013.01); *B60K 15/0409* (2013.01); *B60K 2015/048* (2013.01); *B60K 2015/0458* (2013.01); *B60K 2015/0553* (2013.01)

(56) References Cited

U.S. PATENT DOCUMENTS

| | | |
|---|---|---|
| 9,133,013 B2 * | 9/2015 | Roys ................. B67D 7/344 |
| 2005/0205160 A1 | 9/2005 | Ganachaud et al. |
| 2007/0023102 A1 * | 2/2007 | Cisternino ............ B60K 15/04 |
| | | 141/383 |
| 2012/0161462 A1 | 6/2012 | Zentner |
| 2015/0096983 A1 | 4/2015 | Moy et al. |

* cited by examiner

FILLER NECK HOUSING OR CHARGING HOUSING

RELATED APPLICATIONS

The present application is a National Phase of International Application Number PCT/US2014/070086, filed Dec. 12, 2014, and claims priority to German Application Number 10 2014 102 622.5, filed Feb. 27, 2014.

The invention relates to a filler neck housing or charging housing for insertion into a body opening in a motor vehicle, comprising a housing section with a first sealing section and a second sealing section, the first sealing section being provided on an outer edge, which can be inserted into the body opening, of the housing section and being designed to bear in a sealing manner on the body opening, and the second sealing section being provided on a passage opening in the housing section, into which a tank filler pipe or a plug-in charging connector can be inserted, the second sealing section being designed to bear in a sealing manner against the tank filler pipe or the plug-in charging connector.

Filler neck housings or charging housings for refilling a motor vehicle with fuel or, for example, with a urea solution (AdBlue) or for charging the batteries of an electric or hybrid motor vehicle are inserted, e.g. clipped, into a body opening in the motor vehicle. Moreover, filler neck housings or charging housings of this kind have a passage opening, into which a tank filler pipe leading to the tank of the motor vehicle or a plug-in charging connector connected to batteries of the motor vehicle is inserted. Here, there is a need to seal both the interface between the filler neck housing or charging housing and the body opening and the interface between the filler neck housing or charging housing and the tank filler pipe or plug-in charging connector. One known way of doing this is to attach two sealing rings composed of a soft plastic component to the housing section of the filler neck housing or charging housing, which is formed from a hard plastic, in particular in a two-component injection molding process. Although reliable sealing is achieved in this way, this procedure is complex in terms of production.

Starting from the prior art explained, it is the underlying object of the invention to provide a filler neck housing or charging housing of the type stated at the outset which provides a reliable sealing action in a manner which is simpler in terms of production.

The invention achieves the object by means of the subject matter of claim 1. Advantageous embodiments can be found in the dependent claims, the description and the figures.

For a filler neck housing or charging housing of the type stated at the outset, the invention achieves the object by virtue of the fact
- that the first sealing section and the second sealing section are composed of the same material as the housing section,
- that the first sealing section comprises a plurality of first sealing lamellae formed in an encircling manner on the outer edge of the housing section, a slot being formed in each case between adjacent first sealing lamellae when the housing section is not inserted into the body opening, the slots closing when the housing section is inserted into the body opening, and the first sealing lamellae forming a first sealing ring bearing against the body opening, and
- that the second sealing section comprises a plurality of second sealing lamellae formed in an encircling manner on the passage opening, adjacent second sealing lamellae partially overlapping at least when the tank filler pipe or plug-in charging connector is not inserted into the passage opening, and the second sealing lamellae being pushed apart when the tank filler pipe or plug-in charging connector is inserted into the passage opening and forming a second sealing ring which bears against the outer side of the tank filler pipe or plug-in charging connector.

According to the invention, the subject matter can be a filler neck housing for introducing a fuel, in particular a diesel or gasoline fuel or a liquefied gas, into a tank of a motor vehicle. It can also be a filler neck housing for introducing a urea solution (AdBlue) into a tank of a motor vehicle, for example. A tank filler pipe is then inserted into the filler neck housing. The tank filler pipe has a filler opening, through which the fuel or, for example, a urea solution can be introduced into a tank of the motor vehicle. For this purpose, the tank filler pipe is connected to the tank. The tank filler pipe can have a circular-cylindrical cross section.

According to the invention, the subject matter can also be a charging housing for charging electric batteries of a motor vehicle. In this case, a plug-in charging connector is inserted into the charging housing, and a corresponding plug-in charging connector for charging the electric batteries can be connected thereto. The plug-in charging connector is connected to the electric batteries of the motor vehicle. In turn, the plug-in charging connector can have a circular-cylindrical cross section, in particular. Where the term "plug-in charging connector" is used in this context, this can mean either an electric charging plug or an electric charging socket. It is immaterial for the invention whether a charging plug, to which a corresponding charging socket is connected from the outside, is provided on the charging housing or whether a charging socket, to which a corresponding charging plug is connected from the outside, is provided on the charging housing.

Where the term "motor vehicle" is used here, this means passenger vehicles or trucks for example, irrespective in each case of the type of drive thereof.

In particular, the filler neck housing or charging housing according to the invention can be composed of a plastic, in particular of a hard plastic component. In this case, the first and second sealing sections for sealing relative to the body opening, on the one hand, and relative to the tank filler pipe or plug-in charging connector, on the other hand, are composed of the same material, in particular the same hard plastic component as the housing section, which is simple in terms of production. Thus, there is no need for an additionally molded-on soft plastic component for the seal. There is therefore no need for a complex two-component injection molding process and a corresponding mold, and therefore a considerable cost saving can be achieved. At the same time, a reliable sealing action is achieved at all times. As already mentioned, the housing section can be clipped into the body opening, for example. In general, the body part having the body opening is a sheet-metal part. However, it can also be a plastic part.

For sealing, the first sealing section comprises a plurality of first sealing lamellae formed in an encircling manner on the outer edge of the housing section. A slot is formed in each case between adjacent sealing lamellae in the relaxed state. The first sealing lamellae are designed in the manner of dished seals and, in particular, they are slotted at regular circumferential intervals. The body opening is smaller in cross section, especially in diameter, than the outer edge of the housing section, with the result that the outer edge, in particular the first sealing lamellae, is/are compressed during insertion into the body opening. In the course of insertion into the body opening of smaller cross section, the sealing lamellae are therefore compressed, the slots closing and the first sealing lamellae forming a first sealing ring, which bears against the body opening, and thus ensuring the required sealing. The slots between the first sealing lamellae close at least partially, in particular completely, during insertion into the body opening. The first sealing lamellae, which are subject to an encircling preload, can compensate for the change in geometry in the (compressed) state of insertion into the body opening by virtue of the slots, without the formation of unwanted creases or undulations, which could impair the sealing action.

The second sealing section correspondingly comprises a plurality of second sealing lamellae formed in an encircling manner on the passage opening, adjacent second sealing lamellae partially overlapping at least in the state of rest, i.e. when the tank filler pipe or plug-in charging connector is not inserted. The tank filler pipe or plug-in charging connector is larger in cross section, in particular in diameter, than the passage opening in the housing section, with the result that the second sealing lamellae are pushed apart when the tank filler pipe or plug-in charging connector is inserted and form a second sealing ring which bears against the outer side of the tank filler pipe or plug-in charging connector and thus ensure the required sealing at this interface too. In particular, the second sealing lamellae here form an insertion section which tapers in the direction of introduction of the tank filler pipe or plug-in charging connector. In the uninstalled state, they overlap one another in the manner of roof tiles. The second sealing lamellae subject to an encircling preload deflect liquids or other contaminants, especially those impinging from above, downward and thus likewise lead to sealing which is always adequate for the purpose. In particular, the second sealing lamellae bear against the outer side of the tank filler pipe or plug-in charging connector and thereby ensure assembly and leaktightness.

To ensure that they work, the first and/or second sealing lamellae can be of flexible design, in particular.

The body opening in the motor vehicle, into which the filler neck housing or charging housing according to the invention is inserted, is preferably formed in a deep drawing operation, in particular a sheet-metal deep drawing operation, on the motor vehicle body. The filler neck housing or charging housing according to the invention with the first and second sealing sections makes possible a shallower construction, thus also allowing the deep drawn recess in the body to be made shallower. In practice, embodiments which are shallower by up to 1 mm or by more than 1 mm than conventional filler neck housings or charging housings are possible. Moreover, the first sealing section, in particular, bears by means of its first sealing lamellae directly against the side wall of the deep drawn body recess having the body opening and thus serves as a floating centering means for the filler neck housing or charging housing. As a result, a wider tolerance is possible in the deep drawn recess during the forming of the body opening. Whereas, previously, a tolerance of no more than +/−0.2 mm was permissible, for example, it is possible to compensate for tolerances of up to +/−1 mm with the filler neck housing or charging housing according to the invention. There is no need for an additional fine blanking step for the body opening, and therefore production costs are also reduced in this regard. It is self-evident that the second sealing lamellae of the second sealing section also have a centering effect and also allow larger tolerances at this point by virtue of their relative mobility with respect to one another and the fact that they bear against the tank filler pipe or plug-in charging connector.

It is possible that adjacent first sealing lamellae partially overlap when the housing section is inserted into the body opening. For example, a sealing tongue can be formed in each case on one side of the first sealing lamellae, said sealing tongue in each case overlapping an adjacent first sealing lamella when the housing section is inserted into the body opening. The sealing tongue can be in the form of a step on one side of each of the first sealing lamellae, for example. A particularly good sealing effect is achieved in this way.

It is furthermore possible that the second sealing lamellae furthermore overlap when the tank filler pipe or plug-in charging connector is inserted into the passage opening. As an alternative, it is also possible that the second sealing lamellae no longer overlap when the tank filler pipe or plug-in charging connector is inserted into the passage opening. Optimum sealing is achieved especially when the second sealing lamellae abut one another laterally when the tank filler pipe or plug-in charging connector is inserted.

The housing section and the first and second sealing sections can be produced in a single-component plastics injection molding process. That is to say, production can take place especially in the same injection mold in just one injection molding step. Particularly simple production is thereby achieved.

The filler neck housing or charging housing can comprise a hinge arm which is connected pivotably to the housing section and bears a filler neck flap or charging flap. The hinge arm bears the filler neck flap or charging flap. By pivoting the hinge arm, the filler neck flap or charging flap can be used in a manner known per se to either close the filler neck housing or charging housing or open it for a filling or electric charging process. The filler neck flap or charging flap can be connected integrally to the hinge arm or be designed as a separate component connected to the hinge arm. For example, there may be a desire to produce the filler neck flap or charging flap from the same body panel as the surrounding external skin of the motor vehicle body. At the same time, the hinge arm can be composed of a plastic.

The filler neck housing or charging housing can furthermore comprise a push-push locking device for locking and unlocking or opening the filler neck flap or charging flap. Push-push locking devices of this kind are known per se. In this case, the filler neck flap or charging flap can be pushed by a certain amount into the filler neck housing or charging housing for the purpose of unlocking. This requires a certain depth of the filler neck housing or charging housing. Given this background, the shallower depth, possible according to the invention, of the deep drawn recess having the body opening is particularly advantageous since overall a shallower constructional depth can be achieved, even when a push-push locking device is provided. Of course, solutions without a push-push unlocking device are also possible, e.g. by means of a grip recess in the tank filler flap or charging flap for manual opening.

The tank filler flap or charging flap can comprise the tank filler pipe which is inserted into the passage opening or the plug-in charging connector which is inserted into the passage opening. The tank filler pipe can be a capless tank filler pipe or a conventional tank filler pipe with a closure cap.

The invention also relates to a motor vehicle comprising a filler neck housing or charging housing, which is inserted into a body opening in the motor vehicle.

Figure 2:
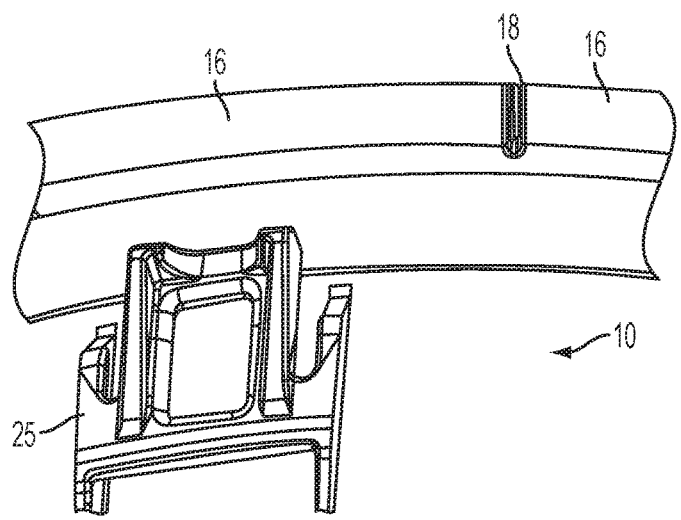
Figure 3:
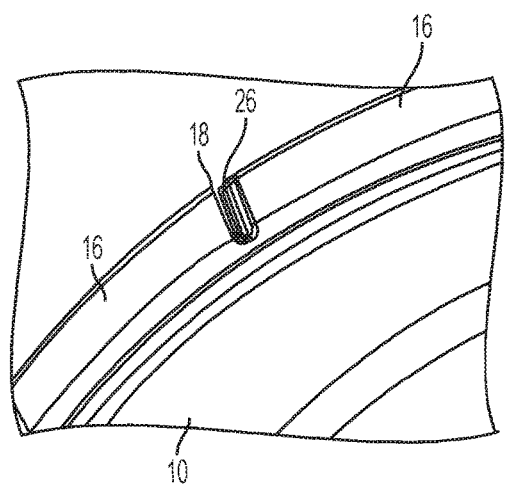
Figure 4:
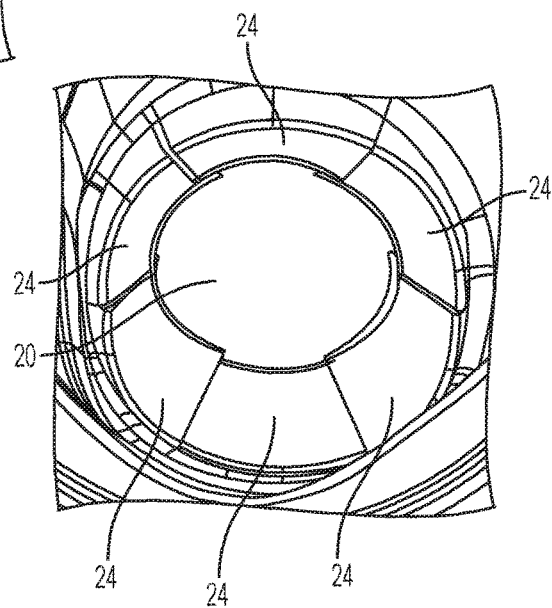
Figure 5:
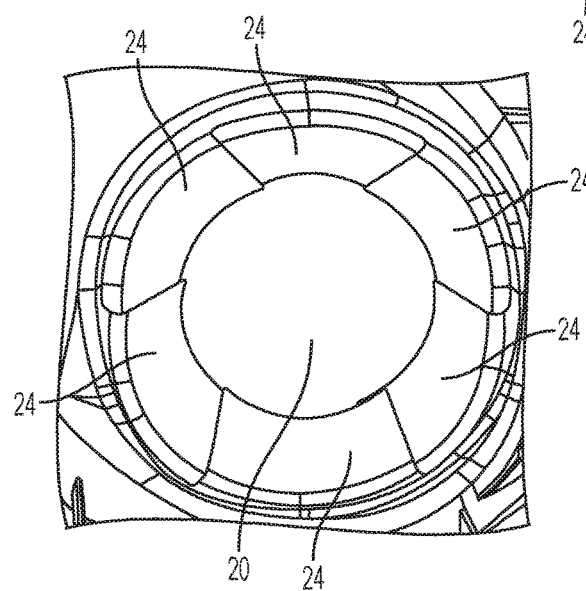
Figure 6:
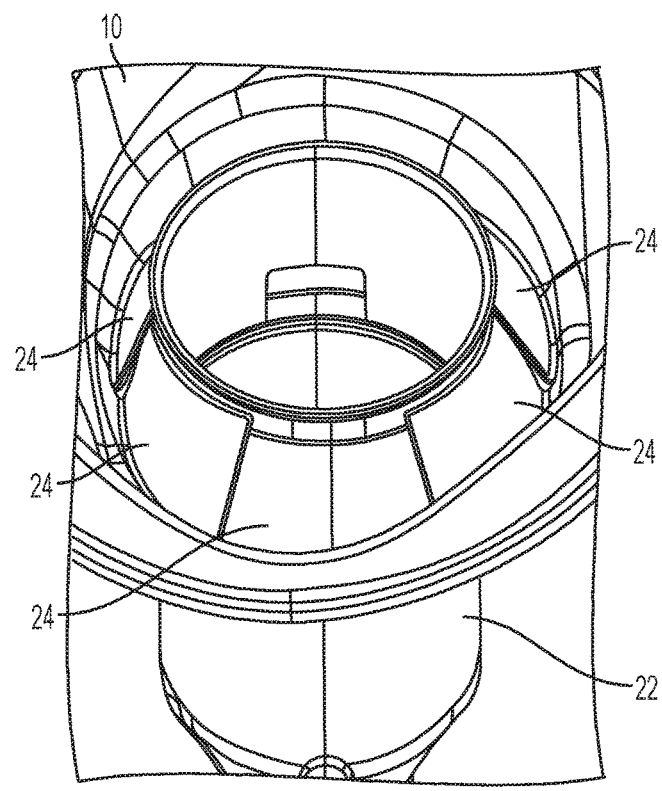
Figure 7:
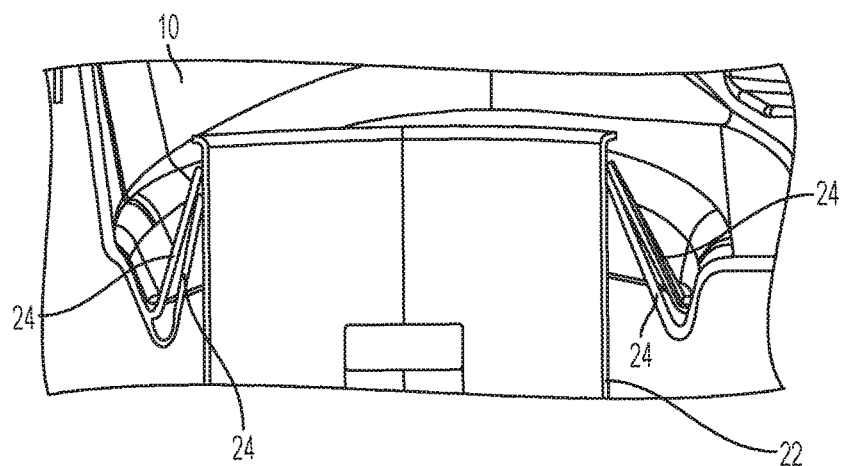
Figure 8:
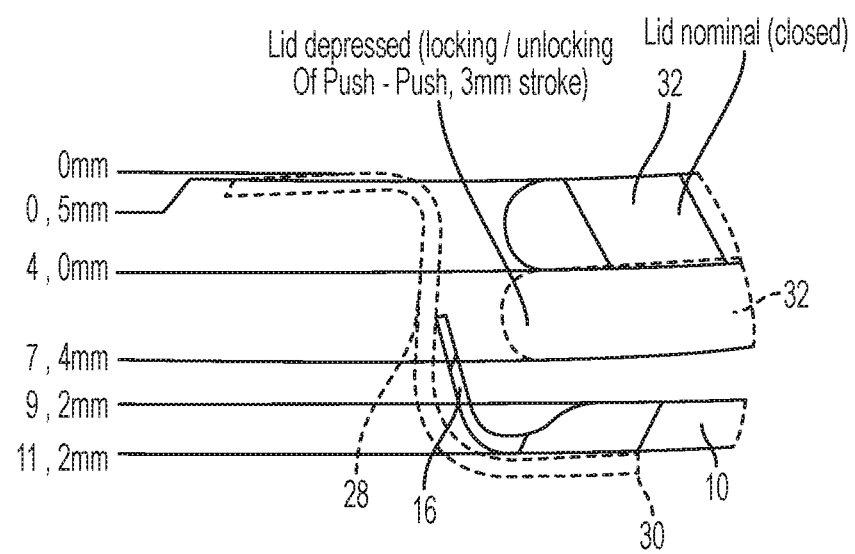

An illustrative embodiment of the invention is explained in greater detail below with reference to schematic figures, of which:

FIG. 1 shows a filler neck housing or charging housing according to the invention in a plan view, FIG. 2 shows an enlarged detail of the filler neck housing or charging housing from FIG. 1 in a rear view, FIG. 3 shows another enlarged detail of the filler neck housing or charging housing from FIG. 1 in a plan view, FIG. 4 shows another enlarged detail of the filler neck housing or charging housing from FIG. 1 in a plan view, FIG. 5 shows the detail from FIG. 4 in a rear view, FIG. 6 shows the view from FIG. 4 with a tank filler pipe or plug-in charging connector inserted into the filler neck housing or charging housing, FIG. 7 shows a sectional view of the illustration from FIG. 6, and FIG. 8 shows another illustration of the filler neck housing or charging housing shown in FIG. 1.

Unless stated otherwise, identical reference signs denote identical items in the figures. The filler neck housing or charging housing according to the invention, which is shown in FIG. 1, has a housing section 10 having a hinge arm 12, which is pivotably mounted on the housing section 10 and on which a filler neck flap or charging flap (not shown specifically) is provided. The fundamental construction of a filler neck housing or charging housing of this kind having a housing section is known per se and therefore will not be explained in greater detail. The housing section 10 is of pot-shaped design and has an outer edge 14 which is circular in the example shown, by means of which the filler neck housing or charging housing can be inserted, e.g. clipped, into a body opening in a motor vehicle. Provided on the outer edge 14 is a first sealing section, which, in the example shown, comprises a plurality of first sealing lamellae 16 formed in an encircling manner on the outer edge 14. The first sealing lamellae 16 are each separated from one another at regular circumferential intervals by a slot 18. In the example shown, the first sealing lamellae are of flexible design.

The housing section 10 furthermore has a passage opening 20 for the insertion of a circular-cylindrical tank filler pipe 22, which is shown in FIGS. 6 and 7 for example. It would also be possible to insert a plug-in charging connector instead of the tank filler pipe 22. The passage opening 20 is delimited by a second sealing section which, in the present case, comprises a plurality of second sealing lamellae 24 formed in an encircling manner on the passage opening 20. In the state of rest shown in FIG. 1, adjacent sealing lamellae 24 overlap one another in the manner of roof tiles. The second sealing lamellae 24 are also flexible. A latching device (clip) for fastening the filler neck housing or charging housing on the body opening, in particular the deep drawn recess in the body, is furthermore shown in FIG. 2 at reference sign 25.

In the enlarged illustration in FIG. 3, it can furthermore be seen that the first sealing lamellae 16 each comprise a sealing tongue 26 of step-type design on one side. Moreover, it can be seen in the figures that the first sealing lamellae 16 extend in a dish-like manner from the outer edge 14 of the housing section 10 and that the second sealing lamellae 24 form a section with a conical taper in the direction of introduction of the tank filler pipe or plug-in charging connector, that is to say out of the plane of the drawing in FIG. 1.

In the example shown, the first sealing lamellae 16 and the second sealing lamellae 24 are composed of the same material as the housing section 10. In particular, the housing section 10 including the first and second sealing lamellae 16, 24 has been produced in an injection mold in a single-component injection molding process, namely from a hard plastic component.

In the course of the insertion of the housing section 10 into the body opening, there is compression of the first sealing lamellae 16, since the opening cross section of the body opening is somewhat smaller than the outside diameter of the outer edge 14 with the first sealing lamellae 16. In the course of this compression, the slots 18 are closed at least partially, in particular completely, and the first sealing lamellae 16 each come to be overlapped by the sealing tongue 26 of the adjacent first sealing lamellae 16. In the state of insertion into the body opening, the first sealing lamellae 16 therefore form a sealing ring which bears sealingly against the body opening to prevent the passage of liquids or other contaminants.

As can be seen especially in FIGS. 6 and 7, there is furthermore expansion of the second sealing lamellae 24 in the course of the insertion of the tank filler pipe 22 (or plug-in charging connector) into the through opening 20, since the diameter of the tank filler pipe 22 (or plug-in charging connector) is somewhat larger than the diameter of the passage opening 20 in the state of rest, shown in FIG. 1, or of the filler neck housing or charging housing. In the inserted state, the second sealing lamellae once again bear sealingly against the outer side of the tank filler pipe 22 (or plug-in charging connector) and also seal this interface against unwanted passage of liquids or other contaminants.

A deep drawn recess, in particular a deep drawn sheet-metal recess, in the body of the motor vehicle having the body opening 30 is shown at reference sign 28 in FIG. 8. It can be seen here how the first sealing lamellae 16 bear against the inner side of the deep drawn recess 28. It can furthermore be seen that the first sealing lamellae 16 extend in the manner of a hood, extending out of the plane of the drawing in FIG. 1. A filler neck flap or charging flap of the filler neck housing or charging housing is furthermore shown in two different states at reference sign 32 in FIG. 8. The "lid nominal (closed)" illustration shows the closed state of the filler neck flap or charging flap. The "lid depressed (locking/unlocking of push-push, 3 mm stroke)" state shows the unlocked state of the filler neck flap or charging flap 32 before being pivoted up into the open position. Thus, the filler neck housing or charging housing shown in the figures has a push-push unlocking device for actuating the filler neck flap or charging flap, said device being shown in extremely schematic form at reference sign 34 in FIG. 1. To unlock the filler neck flap or charging flap, this must be pressed inward by a certain amount, as is known. This is shown in FIG. 8. The configuration in accordance with the invention of the filler neck housing or charging housing with the first and second sealing sections according to the invention also allows a shallower constructional depth overall, even when a push-push unlocking device is used. Thus, a constructional depth of 11.2 mm is sufficient in the example shown for a deep drawn body recess 28 with the body opening 30.

The invention claimed is:

1. A filler neck housing or charging housing for insertion into a body opening in a motor vehicle, comprising a housing section with a first sealing section and a second sealing section, the first sealing section being provided on an outer edge, which can be inserted into the body opening, of the housing section and being designed to bear in a sealing manner on the body opening, and the second sealing section being provided on a passage opening in the housing section, into which a tank filler pipe or a plug-in charging connector can be inserted, the second sealing section being designed to bear in a sealing manner against the tank filler pipe or the plug-in charging connector, wherein the first sealing section and the second sealing section are composed of the same material as the housing section, the first sealing section comprises a plurality of first sealing lamellae formed in an encircling manner on the outer edge of the housing section, respective slots being formed respectively between adjacent first sealing lamellae when the housing section is not inserted into the body opening, the slots closing when the housing section is inserted into the body opening, and the first sealing lamellae forming a first sealing ring bearing against the body opening, and the second sealing section comprises a plurality of second sealing lamellae formed in an encircling manner on the passage opening, adjacent second sealing lamellae partially overlapping at least when the tank filler pipe or plug-in charging connector is not inserted into the passage opening, and the second sealing lamellae being pushed apart when the tank filler pipe or plug-in charging connector is inserted into the passage opening and forming a second sealing ring which bears against the outer side of the tank filler pipe or plug-in charging connector.

2. The filler neck housing or charging housing as claimed in claim 1, wherein adjacent first sealing lamellae partially overlap when the housing section is inserted into the body opening.

3. The filler neck housing or charging housing as claimed in claim 2, wherein respective sealing tongues are formed on respective one sides of the respective first sealing lamellae, said respective sealing tongues respectively overlapping an adjacent first sealing lamella when the housing section is inserted into the body opening.

4. The filler neck housing or charging housing as claimed in claim 1, wherein the second sealing lamellae overlap when the tank filler pipe or plug-in charging connector is inserted into the passage opening.

5. The filler neck housing or charging housing as claimed in claim 1, wherein the second sealing lamellae no longer overlap when the tank filler pipe or plug-in charging connector is inserted into the passage opening.

6. The filler neck housing or charging housing as claimed in claim 1, wherein the housing section and the first and second sealing sections are produced in a single-component plastics injection molding process.

7. The filler neck housing or charging housing as claimed in claim 1, wherein said filler neck housing or charging housing furthermore comprises a hinge arm which is connected pivotably to the housing section and bears a filler neck flap or charging flap.

8. The filler neck housing or charging housing as claimed in claim 7, wherein said filler neck housing or charging housing furthermore comprises a push-push locking device for locking and opening the filler neck flap or charging flap.

9. The filler neck housing or charging housing as claimed in claim 1, furthermore comprising a tank filler pipe which is inserted into the passage opening or a plug-in charging connector which is inserted into the passage opening.

10. A motor vehicle comprising a filler neck housing or charging housing, which is inserted into a body opening in the motor vehicle, as claimed in claim 1.

11. An assembly, comprising:
the filler neck housing or charging housing as claimed in claim 1; and
the tank filler pipe.

12. An assembly, comprising:
the filler neck housing or charging housing as claimed in claim 1; and
the tank filler pipe, wherein the second sealing section is bearing in the sealing manner against the tank filler pipe.

13. An assembly according to claim 12, wherein:
the tank filler pipe connector is inserted into the passage opening.

14. An assembly according to claim 12, wherein:
the tank filler pipe is inserted into the passage opening, the second sealing lamellae is pushed apart due to the tank filler pipe having been inserted into the passage opening such that the second sealing lamellae forms the second sealing ring which is bearing against the outer side of the tank filler pipe.

15. The filler neck housing or charging housing as claimed in claim 1, wherein:
the plurality of second sealing lamellae formed in an encircling manner on the passage opening, adjacent second sealing lamellae partially overlapping.

16. The filler neck housing or charging housing as claimed in claim 1, wherein:
the plurality of second sealing lamellae are pushed apart.

* * * * *